United States Patent
Lee et al.

(10) Patent No.: US 7,693,882 B2
(45) Date of Patent: Apr. 6, 2010

(54) REPLICATING DATA ACROSS THE NODES IN A CLUSTER ENVIRONMENT

(75) Inventors: Ken Lee, San Jose, CA (US); Alok K. Srivastava, Newark, CA (US); Sameer Joshi, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 747 days.

(21) Appl. No.: 11/243,755

(22) Filed: Oct. 4, 2005

(65) Prior Publication Data

US 2007/0078911 A1  Apr. 5, 2007

(51) Int. Cl.
*G06F 17/30* (2006.01)

(52) U.S. Cl. ............... 707/204; 707/101; 707/102; 711/161; 711/162

(58) Field of Classification Search ................ 707/204, 707/101–102; 711/161–162
See application file for complete search history.

(56) References Cited

U.S. PATENT DOCUMENTS

| 5,802,383 | A | * | 9/1998 | Li et al. ................. 709/224 |
| 6,748,381 | B1 | * | 6/2004 | Chao et al. ............... 707/201 |
| 7,082,506 | B2 | * | 7/2006 | Nakano et al. ............ 711/162 |
| 7,389,300 | B1 | * | 6/2008 | Shah et al. ............... 707/101 |
| 2002/0073204 | A1 | * | 6/2002 | Dutta et al. .............. 709/227 |
| 2002/0194429 | A1 | * | 12/2002 | Chiu et al. ............... 711/118 |
| 2004/0158588 | A1 | * | 8/2004 | Pruet, III ................. 707/204 |
| 2004/0254984 | A1 | * | 12/2004 | Dinker .................... 709/205 |
| 2006/0031450 | A1 | * | 2/2006 | Unrau et al. ............. 709/223 |
| 2006/0248371 | A1 | * | 11/2006 | Chen et al. ................. 714/4 |
| 2006/0271530 | A1 | * | 11/2006 | Bauer ........................ 707/5 |

* cited by examiner

*Primary Examiner*—Mohammad Ali
*Assistant Examiner*—Thuy (Tiffany) Bui
(74) *Attorney, Agent, or Firm*—Hickman Palermo Truong & Becker LLP (57) ABSTRACT

Techniques are provided for managing replicated data items in a cluster of shared nothing nodes. The techniques include synchronously propagating changes to one or more replicas, while asynchronously propagating changes to the remaining replicas. Because the replicas to which the change is synchronously replicated may be a relatively small percentage of the total number of replicas, the overhead associated with performing an update is reduced. The process of selecting which nodes are involved in the synchronous update operation may take into account a variety of factors, including which replicas are available at the time the update operation is being performed.

50 Claims, 2 Drawing Sheets

FIG. 1

FIG. 2

REPLICATING DATA ACROSS THE NODES IN A CLUSTER ENVIRONMENT

FIELD OF THE INVENTION

The present invention relates to shared nothing clusters and, more specifically, to managing data that is replicated across multiple nodes of a shared nothing cluster.

BACKGROUND

A "cluster" is a system that includes a plurality of nodes which, for the purposes of providing access to data, appear to clients as a single unit. Within a cluster, each node typically has its own processor(s) and volatile memory. Typically, the nodes of a cluster are able to communicate with each other using a communication mechanism, such as a network. Clusters may be implemented according to either a "shared-disk" architecture, or a "shared-nothing" architecture.

In a shared-disk cluster, the nodes of the cluster have shared access to persistent storage, such as a set of magnetic drives. However, the larger a shared-disk cluster becomes, the more the shared storage becomes a bottleneck in the system. In particular, as the size of a shared-disk cluster increases, there usually are corresponding increases in (1) the average distance between the nodes and the shared storage, and (2) the amount of contention to access the shared storage.

In a shared-nothing cluster, each node of the cluster may have its own persistent storage. This avoids the shared-access bottleneck of the shared-disk cluster. Unfortunately, the lack of shared storage gives rise to other issues, such as how to manage data items that need to be available to large numbers of nodes in the cluster. Data items that need to be available to multiple nodes in a cluster are referred to herein as "popular data items". Popular data items include, for example, sets of data, such as cluster configuration data, that needs to be available to every node in the cluster.

Managing Popular Data Items in a Shared-Nothing Cluster

One approach to managing popular data items in a shared-nothing cluster involves storing a replica of each popular data item on each node. Thus, if data item X must be seen by all fifty nodes in a cluster, a separate replica of data item X is stored on the persistent storage of each of the fifty nodes.

By maintaining fifty replicas of a popular data item in a fifty-node shared-nothing cluster, the bottleneck problem associated with shared-disk clusters is avoided. However, this solution is not without its drawbacks. Specifically, it is often critical for all of the nodes in a cluster to see the same version of each popular data item. When such is the case, a change to any replica of a popular data item requires a corresponding change to every other replica of the same popular data item.

To ensure that a change to a replica of a popular data item is not lost, the change to the replica, and the corresponding changes to all other replicas, are typically performed as a single atomic operation by a distributed transaction. An "atomic" operation is an operation performed in a manner that ensures that the system reflects either (1) all changes made by the operation, or (2) no changes made by the operation.

Changes that are made as part of the same atomic operation are considered "synchronous" relative to each other because they all become permanent at the same time. The "two-phase commit" protocol is a protocol that may be used to ensure that all replicas are updated in a single atomic operation.

Two-Phase Commit Protocol

According to the two-phase commit protocol, one node (the coordinating node) is responsible for coordinating the commitment of a distributed transaction on one or more other nodes. The other nodes that hold data affected by the transaction are referred to as participating nodes.

A two-phase commit involves two-phases, the prepare phase and the commit phase. In the prepare phase, the transaction is prepared in each of the participating nodes. When a transaction is prepared on a node, the data is put into such a state that it is guaranteed that modifications specified by the transaction to the data can be committed. When all participants involved in a transaction are prepared, the prepared phase ends and the commit phase may begin.

In the commit phase, the coordinating node commits the transaction on the coordinating node and on the participating nodes. Specifically, the coordinating node sends messages to the participants requesting that the participants commit the modifications specified by the transaction to data on the participating nodes. The participating nodes and the coordinating node then commit the transaction.

Changes made by a participating node on behalf of a distributed transaction are executed as a subtransaction. To commit a distributed transaction, a participating node commits its respective subtransaction of the distributed transaction. Finally, the participating nodes transmit a message acknowledging the commit to the coordinating node.

If a participating node is unable to prepare, or the coordinating node is unable to commit, then at least one of the nodes is unable to make the changes specified by the transaction. In this case, all of the modifications at each of the participants and the coordinating node are retracted, restoring each node to its state prior to the changes.

Synchronization Overhead

The two-phase commit protocol ensures data consistency while providing simultaneous processing of modifications to replicated data items. Thus, the two-phase commit protocol is well-suited to the task of maintaining all of the replicas of a popular data item in sync.

Unfortunately, the two-phase commit does not achieve data consistency without cost. For example, participating nodes involved in the distributed transaction experience latency when waiting for other nodes to become prepared. While the participating nodes are waiting, resources affected by the distributed transaction are locked. The resources remain locked until all participating nodes are prepared, the coordinator transmits a message to the participating nodes to commit, and the participating systems commit their respective subtransactions. This leads to contention problems, because other processes waiting for the locked resources to become available are stalled until those resources are freed. A delay by any participating node in preparing to commit increases the amount of time other processes will have to wait for locked resources.

As the size of a cluster increases, so does the overhead associated with synchronously updating the replicas of a popular data item. Therefore, it is desirable to provide techniques for maintaining popular data items in a manner that (1) ensures that updates to the popular data item are not lost, and (2) avoids the latency problems associated with maintaining all of the replicas in sync.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for maintaining popular data items without incurring the overhead associated with keeping all replicas of the data items in sync. According to one embodiment, a change to one replica of a popular data item is not synchronously propagated to all other replicas. Instead, the change is synchronously applied, in a single atomic operation, at a subset of the replicas. Once this single atomic operation is complete, the change to the data item is declared successfully. The subset of replicas at which the change is synchronously applied is referred to herein as the "sync subset". The subset of replicas that is not in the "sync subset" is referred to herein as the "async subset". Typically, the sync subset will include the replica to which the change was directed, and one or more other replicas. However, it is possible that the sync set has no replica, in which case all of the replica belongs to the async subset. The two-phase commit protocol is an example of a protocol that may be used to synchronously apply the change to the replicas in the sync subset, all as a single atomic operation.

The sync subset may be very small relative to the total number of replicas of the popular data item. For example, in a system that includes 1,000 replicas, the change may be synchronously applied to only two of the replicas. Thus, the latency incurred by the synchronous propagation is small, and does not necessarily increase with the size of the cluster. Once the change has been synchronously replicated to the replicas in the sync set, the change is secure in that a single-node failure will not cause the cluster to lose the change.

To ensure that all of the replicas eventually reflect the change, the change is asynchronously propagated to all of the remaining replicas of the data item. Because this asynchronous propagation operation is not part of the atomic operation used to change the replicas in the sync set, the number of replicas involved in the asynchronous propagation (which may be very large) does not affect the latency of the initial change operation.

Selecting the Sync Set

When a node receives a request to change a replica of a popular item, the node needs to know which replicas should be synchronously changed. A variety of techniques may be used to determine which replicas to include in the sync set for any given change. For example, the sync set for a change may be determined on-the-fly, at the time the change is requested. Alternatively, the sync set for a change may be predetermined, based on previously established relationships between the various nodes. Various techniques shall be described hereafter for selecting the sync set for a given change.

Determining How Many Nodes are in the Sync Set

The more nodes that are in the sync set, the more fault-tolerant the cluster will be relative to the popular data. However, the larger the sync set, the greater the overhead associated with updating popular data items. Various techniques may be used to select an appropriate size for the sync set. In general, choosing the right size of the sync set involves striking a balance between the risk of losing committed writes and the performance overhead associated with a larger sync set.

Techniques for performing updates, in a cluster, in a manner that ensures that later-formed quorums will include at least one node of the most-recently-formed previous quorum, are described in U.S. patent application Ser. No. 11/124,456, entitled "PROVIDING THE LATEST VERSION OF A DATA ITEM FROM AN N-REPLICA SET", the contents of which are incorporated herein by this reference.

To eliminate potential data loss in a single-node failure scenario, the sync set only needs to comprise of two nodes. However, if the number of nodes in the sync set is less than a certain percentage of the total number of nodes in the cluster, it is possible to lose those committed data changes that are only made to the nodes in the sync set, in the event that all of the nodes in the sync set become unavailable. Specifically, when the number of nodes in the sync set is less than a certain percentage of the total number of nodes in the cluster, the surviving nodes in the cluster may be able to attain a quorum to form a new cluster that does not include any of the nodes in the sync set.

To eliminate the possibility of losing the changes made to the sync set, the number of nodes in the sync may be set to at least X % of the total number of members in the cluster, where more than (100%−X %) of nodes from the most-recently-formed cluster are required to form a new cluster.

According to one embodiment, a mechanism is provided for allowing a user to specify how many nodes are in the sync set used when changes are made to a particular data item. Alternatively, the system may automatically select the number based on characteristics of the system. For example, the system may automatically sync all of the replicas, up to a maximum threshold amount, such as eight.

Statically-Mapped Sync Sets

According to one embodiment, the sync set for a change operation is determined, at least in part, based on a static mapping that establishes relationships between replicas. For example, consider the cluster 100 illustrated in FIG. 1. The cluster 100 includes five nodes n1, n2, n3, n4 and n5 which respectively store five replicas r1, r2, r3, r4 and r5 of an object that contains popular data items. Each of replicas r1, r2, r3, r4 and r5 should contain the same set of data. For example, the replica may contain data1, data2, data3, etc.

Figure 1:
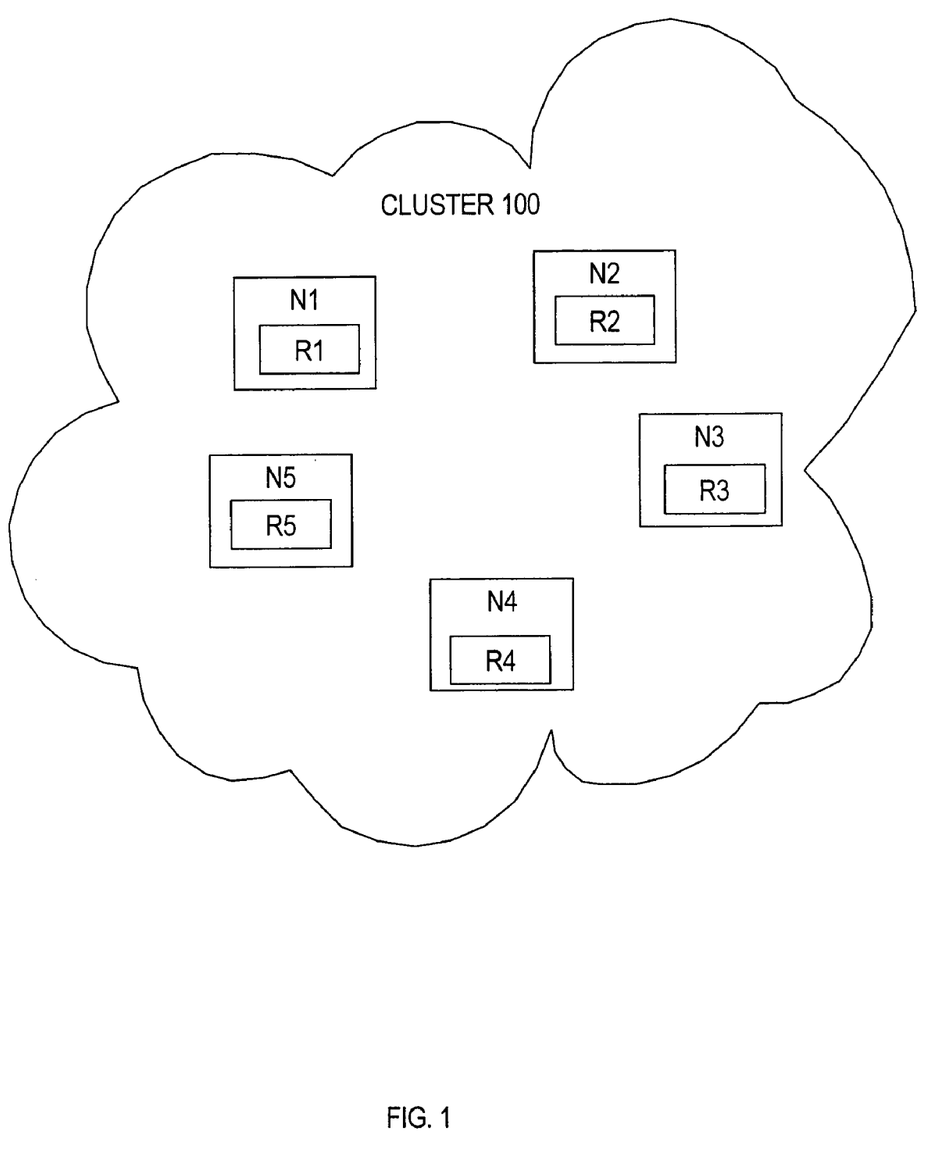
FIG. 1 is a block diagram of a multiple-node cluster upon which embodiments of the invention may be implemented.

A static "sync mapping" may establish the sync set for the replica to be r1 and r2, regardless of the node that receives the request to perform an operation on the replica. Under these circumstances, when an attempt is made to update one of the replicas, the node that receives the update request inspects the sync mapping to determine which replicas to include in the sync set. Thus, if a request is sent to n1 to modify data1, according to the statically-mapped sync set, data1 should be modified on r1 (which is hosted by n1) and r2 (which is hosted by n2) synchronously, and to other replicas (r3, r4 and r5) asynchronously.

More interestingly, if the request is sent to n4 to modify data1, according to the statically-mapped sync set, data1 should be modified on r1 (which is hosted by n1) and r2 (which is hosted by n2) synchronously, and to other replicas (r3, r4 and r5) asynchronously. Note that in this example, n4 is not one of the hosts in the sync set for data 1 even though n4 received the request.

In an alternative embodiment, the static mapping may establish sync sets that vary based on the node that receives the request. For example, the static mapping may establish the sync set for node n1 to be replicas r1 and r3; the sync set for n2 to be replicas r2 and r3; the sync set for n3 to replicas r3 and r4; the sync set for n4 to replicas r1 and r2; and the sync set for n5 to be replicas r5 and r1. Under these circumstances, an update received by n2 would be synchronously made r2 and r3, and asynchronously made at the other replicas. On the other hand, an update received n4 would be synchronously made at r1 and r2, and asynchronously made at the other replicas.

Closeness Based Sync Sets

According to one embodiment, the sync sets for a change operation is determined, at least in part, based on how "close" the replicas are to each other. In this context, "closeness" may be determined based on a variety of factors, such as the relative speed of communication between the nodes, the amount of traffic between the nodes, and the actual geographic location of the nodes. Regardless of how closeness is determined, the cluster may be configured to use the "closeness" measure to establish "closest-neighbor sync sets". A system that uses closest-neighbor sync sets may, for example, establish the sync set to be (1) the replica against which the change was requested, and (2) the N closest other replicas. For example, if N is 2, then a change made to replica r2 would by synchronously propagated to two other replicas deemed to be "closest" to replica r2.

The motivation for "closest-neighbor sync sets" is for speed/latency. However, using closest-neighbor sync sets has a downside that, if two nodes are placed close to each other, both nodes might be affected in the same disaster, such as an earthquake. In an alternative embodiment, a system may use the closeness determination to establish "furthest-neighbor sync sets". Using furthest-neighbor sync sets, sync sets are established to include nodes that are not close to each other, for maximum survivability when a disaster strikes.

Critically-Based Sync Sets

According to one embodiment, the number of nodes in a sync set, and how those nodes are selected, may vary from data item to data item based on a characteristic of the data item. For example, some pieces of information are considered more "critical" than other pieces of information. The number of nodes in the sync set for a particular data item, and how those nodes are selected, may vary based on how "critical" the data item is.

For example, various pieces of information may be associated with a bank account, such as the current balance, the customer account number, the date of the last transaction, and information about past transactions. Of these pieces of information, the current balance and customer account number are more critical than the other pieces of information because without the current balance and customer account number, it would be difficult to perform any banking activity. Because the current balance and customer account number have a higher degree of "criticality", the sync set for these pieces of information may have more nodes than the sync set for the other pieces of information. In addition, the sync set for the current balance and customer account number may be selected to include a more geographically dispersed set of nodes, while the nodes in the sync set for less critical information may be selected because of their closeness to the node on which the change was received.

Directory-Based Sync Sets

According to one embodiment, a "directory" node is established for each popular data item. The directory node for a popular data item may, for example, be determined by the hash value produced by applying a hash function of an identifier associated with the data item. When hashing is used in this manner, each data item will have a single directory node, but different data items may have different directory nodes. A hash function is merely one example of a mechanism that may be used to establish a data-item-to-directory-node mapping. The specific mechanism used to identify the directory node of a data item may vary from implementation to implementation.

In a cluster that has a mechanism for establishing a data-item-to-directory-node mapping, the mechanism may be used to determine the sync set for updates to the data item. For example, in one embodiment, the cluster can establish the sync set to always include the directory node of the data item that is being changed. If the cluster is using 2-node sync sets, then the sync set would include (1) the replica on the node against which the change was requested (the "queried node"), and (2) the replica on the directory node of the data item.

When a directory-based sync set approach is used by a cluster, the directory node of a data item will always include the most recent version of the data item. This fact may be used to perform on-demand updates during read operations. Specifically, in one embodiment, when a queried node receives a request to read a data item, the queried node determines the directory node for the data item. Once the directory node has been determined, the queried node sends a message to the directory node to request the current version number of the data item.

When the queried node receives the current version number of the data item, the queried node is able to determine whether the version of the data item that resides at the queried node is the most current version of the data item. If the version of the data item that resides at the queried node is the most current version of the data item, then the queried node may respond to the initial request based on the version of the data item that resides at the node.

If, on the other hand, the version of the data item that resides at the queried node is not the most current version of the data item, then the queried node may request a copy of the current version of the data item from the directory node. Upon receiving the current version of the data item, the queried node may update its stored version of the data item, and respond to the initial request.

In order to reduce the traffic between queried nodes and directory nodes, the message sent from a queried node to the directory node may include data indicating the version of the replica that resides at the queried node. The directory node compares the version number in the message with the current version number to determine whether the queried node has the current version. If the queried node has the current version, then the directory node sends a message to the queried node to indicate that the queried node has the current version. If the queried node does not have the current version, then the directory node may send the current version to the queried node, without waiting for a separate message to request the current version.

In one embodiment, the directory node for a data item keeps track of which node initiated the most recent update to the data item. This "most-recent-updater" information may be provided to queried nodes, so that the queried nodes can obtain the most recent version of the data item from the most-recent-updater, rather than from the directory node itself.

In an alternative embodiment, the directory node need not be included in the sync set. However, as part of the atomic operation used to update the sync set, the directory node stores data that identifies one or more of the members of the sync set. For example, the directory node may store, as part of the atomic operation, data that identifies the most-recent-updater. In such an embodiment, the directory node may not always be able to provide the latest version of the data item, but it would be able to identify at least one node that is able to provide the latest version of the data item.

When the directory node for a particular data item is unavailable, a new directory node must be selected based on some algorithm. For example, the new directory may be selected using a hashing algorithm based on the data. Since the old directory node is the only node with knowledge about what is the latest version of the data or which nodes have the latest version of the data, the new directory node must reconstruct this knowledge by querying every available node in the cluster. The highest version received by the new directory node becomes the latest (current) version. Nodes should only return committed data for this inquiry. The new directory node should also populate this data to every node in the sync set (if nodes in the sync set are changed) before allowing further modification to the data.

Availability-Driven Sync Sets

According to one embodiment, the replicas that are selected to be in the sync set of a change operation are determined, at least in part, based on which replicas are available at the time the change operation is to be performed. The availability of replicas may be a factor that is used in conjunction with any other sync set selection strategy.

For example, a cluster that employs the "closest-neighbor" technique may take into account the availability of replicas at the time of the change operation by establishing the sync set to be (1) the replica against which the change was requested, and (2) the N closest other replicas that are available. Thus, when all of the replicas available, an update to r1 may result in a sync set that includes r1, r2 and r4. However, a change made to r1 when r2 is unavailable may result in a sync set that includes r1, r3 and r4.

Similarly, a cluster that employs a static mapping technique may take into account the availability of the replicas at the time of the change operation by establishing a mapping between each replica and a sequence of other replicas. For example, the replica r1 may be mapped to the sequence r2, r4, r3, r5. When a change is made to r1, the system may then pick the first two replicas, from the sequence, that are available. Thus, if replica r2 is not available, then the sync set would be r1, r4 and r3. Similarly, if replicas r2 and r3 are not available, then the sync set would be r1, r3 and r5.

Selecting the Async Set

As mentioned above, those replicas that are not part of the sync set are in the async set. Data are populated to these replicas asynchronously. The size of the async set can be ranged from zero to all of the replicas. In one extreme case, when the size of the async set is zero, the sync set includes all of the replicas—achieving the maximum availability. On the other hand, if the async set contains all of the replicas, it means the data would not be synchronously updated on any replicas. This is useful to replicate the less critical data with best possible performance.

Since the number of replicas in the async set can be large, several techniques can be used to optimize this operation based on various situations or requirements. One technique is to update the data to the replicas in the async set in parallel. This can be further fine turned by specifying, for example, how many replicas are to be updated in parallel (the degree of parallelism for the update operation). If the degree of parallelism is high, then a large number of replicas can be updated in a short period of time. However, a high degree of parallelism consumes a large amount of networking bandwidth.

On the other hand, the data can be updated to each replica in the async set in a serialized order. Since each replica is updated one by one, it could take considerable more time to finish the update in the async set. However, the load to the network is much smaller. When the replicas are updated in an order, several factors can influence the order. For example, if the goal is to update the data to as many replicas as possible within the shortest amount of time (for achieving higher availability of the data), nodes that are located closer, more responsive/powerful, or have faster network connection should be updated first.

When a replica completes the data update successfully, it should let the requester know about the status so that the requester can record the completion of the update to this replica. If a replica in the sync set fails to update the data, retry can be attempted or the replica must be removed from the replica set.

It is possible that a new request to update a data item is received before the completion of the previous update to the same data item on each replica in the async set. Depending on the nature of the data, the latest update can be applied to a replica that has not received some previous data update. This can significantly improve the performance of the entire process of updating the async set.

Cluster Registry Example

The techniques described herein may be used in any situation in which multiple replicas of the same data item are stored on different nodes within a cluster. Cluster registry information is an example of a type of information that may be replicated on nodes throughout a cluster. In the context of the cluster registry, the techniques may be employed by using the following protocols to create/update and read key values within the registry:

To Create/update a key:
1. Map the key is to the node where the directory for this key is stored.
2. Send a request to the directory node to register the local node as the writer for this key.
3. The local node writes the key to its local copy and synchronously requests the directory node to do the same.
4. If both complete successfully, then the local node lets the client know the key has been updated/created.
5. Meanwhile, the local node asynchronously requests other nodes in the cluster to update/create the key.

To Read a key:
1. Map the key to the node where the directory for this key is stored.
2. Send a request to the directory node to find out the writer node and the current version of the key.
3. If the local node has the current version of the key, it returns the information related to the key from the local copy to the client.
4. If the local node does not have the current version of the key, then it sends a request to the writer node to retrieve the latest information about this key.

To recover a key after cluster reconfiguration:
1. The new directory node asks each surviving node in cluster to send in the current version of the key that it knows of.
2. The highest version of the key that the new directory receives becomes the latest version of the data.
3. The new directory node propagates this key to each node in the new sync set to meet the availability requirement.
4. The new directory node is ready to process future request for reading/updating the key.

Hardware Overview

Figure 2:
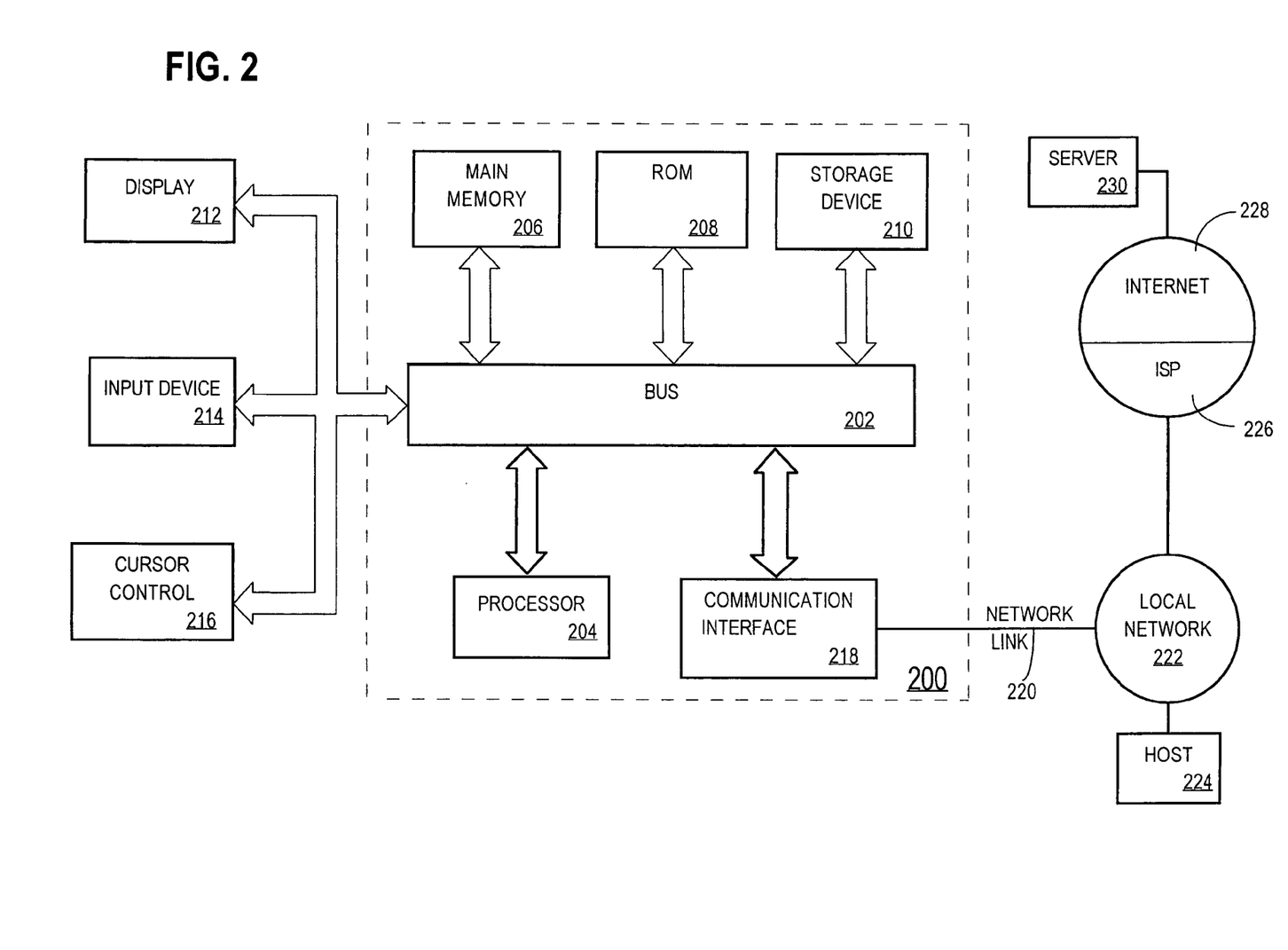
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing multiple copies of a data item, the method comprising in response to a request to perform an operation that affects the data item, performing the steps of
   identifying two or more copies of the data item that are to be in a sync set for the operation;
   as a single atomic operation, causing the operation to be performed on all copies of the data item that are in the sync set, wherein the operation is considered successful as soon as the atomic operation is successfully completed;
   separate from said single atomic operation on the sync set, causing the operation to be performed asynchronously on an async set for the operation, wherein the async set includes copies of the data item that are not in the sync set;
   after performance of the single atomic operation, receiving a request to read the data item;
   in response to the request to read, determining whether a particular copy of the data item was in the sync set of the data item;
   if the particular copy is in the sync set, then responding to the request based on the particular copy;
   otherwise, if the particular copy is in the async set of the data item, then:
      determining whether the data item reflects the most recent changes to the data item;
      if the particular copy that is in the async set does reflect the most recent changes to the data item, then responding to the request to read based on the particular copy that is in the async set of the data item; and
      if the particular copy that is in the async set does not yet reflect the most recent changes to the data item, then identifying a copy of the data item that does reflect the most recent changes to the data item, and responding to the request to read based on the copy of the data item that does reflect the most recent changes to the data item;
   wherein the method is performed by a computer programmed to be a special purpose machine pursuant to instructions from program software.

2. The method of claim 1 wherein the step of causing the operation to be performed on all copies of the data item that are in the sync set is performed using a two-phase commit protocol.

3. The method of claim 1 wherein the operation is an update to the data item.

4. The method of claim 1 wherein each of the multiple copies resides on a separate storage device.

5. The method of claim 4 wherein each storage device that contains a copy of the data item is managed by a different node in a cluster that contains a plurality of nodes.

6. The method of claim 1 wherein the multiple copies of the data item are maintained within a cluster and the data item reflects information about the configuration of said cluster.

7. The method of claim 1, wherein the multiple copies of the data item are maintained within a cluster, the method further comprising automatically determining how many nodes to include in the sync set based, at least in part, on how many nodes are in the cluster.

8. The method of claim 7 wherein:
   more than (100%−X %) of nodes from a most-recently-formed cluster are required to form a new cluster; and
   the step of determining how many nodes to include in the sync set includes determining that the sync set must include at least X % of the total number of nodes in the cluster.

9. The method of claim 1, wherein the sync set comprises a number of nodes, wherein the number of nodes included in the sync set is specified by user input.

10. The method of claim 1 wherein:
    the step of receiving a request is performed by a node in a cluster that includes a plurality of nodes; and
    the step of identifying two or more copies of the data item that are to be in the sync set is performed based, at least in part, on a closeness measure between the node that received the request and the other nodes of the cluster that contain copies of the replica.

11. The method of claim 10 wherein the step of selecting based on a closeness measure includes selecting a copy because the copy is close to the node that received the request.

12. The method of claim 10 wherein the step of selecting based on a closeness measure includes selecting a copy because the copy is far from the node that received the request.

13. The method of claim 1 wherein:
    the step of receiving a request is performed by a node in a cluster that includes a plurality of nodes;
    a particular node, of the plurality of nodes, is designated to be the directory node of the data item; and
    the step of identifying two or more copies of the data item that are to be in the sync set includes selecting a copy of the data item that resides on said directory node.

14. The method of claim 1 wherein:
the step of receiving a request is performed by a node in a cluster that includes a plurality of nodes;
a particular node, of the plurality of nodes, is designated to be the directory node of the data item; and
the method includes, as part of said single atomic operation, updating information on said directory node to indicate one or more nodes that had copies of the data item updated as part of the single atomic operation.

15. The method of claim 1 wherein:
the method includes determining how critical the data item is considered to be; and
the copies of the data item that are to be in the sync set are determined based, at least in part, on how critical the data item is considered to be.

16. The method of claim 1 wherein:
the instructions include instructions for reading data that indicates a statically established sync set for the data item; and
the copies of the data item that are to be in the sync set are determined based, at least in part, on the statically established sync set for the data item.

17. The method of claim 1 wherein the step of determining which copies are to be in the sync set includes establishing the sync set to be a copy against which the operation was requested, and the N closest other copies of the data item that are available.

18. The method of claim 1 wherein:
a static mapping is established between each copy and a sequence of other copies; and
the step of determining which copies are to be in the sync set includes establishing the sync set to be a copy against which the operation was requested, and the first N available copies in the sequence associated with the copy against which the operation was requested.

19. The method of claim 1 wherein the instructions include instructions for updating the copies in the async set in parallel.

20. The method of claim 1 wherein the instructions include instructions for updating the copies in the async set in serial.

21. The method of claim 1 wherein the copies in the async set are updated according to an order that is established based, at least in part, on at least one of:
the location of nodes that store the copies;
a performance characteristic of the nodes that store the copies; and
a performance characteristic of the network connections of the nodes that store the copies.

22. The method of claim 1 wherein a later-executed update is applied to a copy that belongs to the async set before an earlier-executed update is applied to said copy.

23. The method of claim 1, further comprising the step of:
determining, at the time the operation is to be performed, which copies of the data item are available for the operation to be performed on them;
wherein the two or more copies of the data item that are to be in the sync set are selected based, at least in part, on which copies of the data item are determined to be available for the operation to be performed on them at the time the operation is to be performed.

24. The method of claim 1, wherein the request is a request to perform an operation based on a particular copy of the data item, wherein the two or more copies include the particular copy.

25. The method of claim 1, wherein:
each copy of the data item is managed by a different node of a plurality of nodes;
the method comprises a first node of the plurality of nodes receiving the request to perform the operation that affects the data item;
the sync set includes at least a first copy of the data item, wherein the first copy is managed by the first node; and
the method is performed by the first node.

26. A computer-readable storage medium storing one or more sequences of instructions which, when executed by one or more processors, causes the one or more processors to perform:
identifying two or more copies of the data item that are to be in a sync set for the operation;
as a single atomic operation, causing the operation to be performed on all copies of the data item that are in the sync set, wherein the operation is considered successful as soon as the atomic operation is successfully completed; and
separate from said single atomic operation on the sync set, causing the operation to be performed asynchronously on an async set for the operation, wherein the async set includes copies of the data item that are not in the sync set;
after performance of the single atomic operation, receiving a request to read the data item;
in response to the request to read, determining whether a particular copy of the data item was in the sync set of the data item;
if the particular copy is in the sync set, then responding to the request based on the particular copy;
otherwise, if the particular copy is in the async set of the data item, then:
determining whether the data item reflects the most recent changes to the data item;
if the particular copy that is in the async set does reflect the most recent changes to the data item, then responding to the request to read based on the particular copy that is in the async set of the data item; and
if the particular copy that is in the async set does not yet reflect the most recent changes to the data item, then identifying a copy of the data item that does reflect the most recent changes to the data item, and responding to the request to read based on the copy of the data item that does reflect the most recent changes to the data item.

27. The computer-readable storage medium of claim 26 wherein the step of causing the operation to be performed on all copies of the data item that are in the sync set is performed using a two-phase commit protocol.

28. The computer-readable storage medium of claim 26 wherein the operation is an update to the data item.

29. The computer-readable storage medium of claim 26 wherein each of the multiple copies resides on a separate storage device.

30. The computer-readable storage medium of claim 29 wherein each storage device that contains a copy of the data item is managed by a different node in a cluster that contains a plurality of nodes.

31. The computer-readable storage medium of claim 26 wherein the multiple copies of the data item are maintained within a cluster and the data item reflects information about the configuration of said cluster.

32. The computer-readable storage medium of claim 26 wherein the multiple copies of the data item are maintained within a cluster, the computer-readable storage medium further storing one or more sequences of instructions which, when executed by the one or more processors, causes the one or more processors to perform:

automatically determining how many nodes to include in the sync set based, at least in part, on how many nodes are in the cluster.

33. The computer-readable storage medium of claim 32 wherein:
more than (100%−X %) of nodes from a most-recently-formed cluster are required to form a new cluster; and
the step of determining how many nodes to include in the sync set includes determining that the sync set must include at least X % of the total number of nodes in the cluster.

34. The computer-readable storage medium of claim 26, wherein the sync set comprises a number of nodes, wherein the number of nodes included in the sync set is specified by user input.

35. The computer-readable storage medium of claim 26 wherein:
the step of receiving a request is performed by a node in a cluster that includes a plurality of nodes; and
the step of identifying two or more copies of the data item that are to be in the sync set is performed based, at least in part, on a closeness measure between the node that received the request and the other nodes of the cluster that contain copies of the replica.

36. The computer-readable storage medium of claim 35 wherein the step of selecting based on a closeness measure includes selecting a copy because the copy is close to the node that received the request.

37. The computer-readable storage medium of claim 35 wherein the step of selecting based on a closeness measure includes selecting a copy because the copy is far from the node that received the request.

38. The computer-readable storage medium of claim 26 wherein:
the step of receiving a request is performed by a node in a cluster that includes a plurality of nodes;
a particular node, of the plurality of nodes, is designated to be the directory node of the data item; and
the step of identifying two or more copies of the data item that are to be in the sync set includes selecting a copy of the data item that resides on said directory node.

39. The computer-readable storage medium of claim 26 wherein:
the step of receiving a request is performed by a node in a cluster that includes a plurality of nodes;
a particular node, of the plurality of nodes, is designated to be the directory node of the data item; and
the instructions, when executed by the one or more processors, further cause, as part of said single atomic operation, updating information on said directory node to indicate one or more nodes that had copies of the data item updated as part of the single atomic operation.

40. The computer-readable storage medium of claim 26 wherein:
the instructions, when executed by the one or more processors, further cause determining how critical the data item is considered to be; and
the copies of the data item that are to be in the sync set are determined based, at least in part, on how critical the data item is considered to be.

41. The computer-readable storage medium of claim 26 wherein:
the instructions include instructions for reading data that indicates a statically established sync set for the data item; and
the copies of the data item that are to be in the sync set are determined based, at least in part, on the statically established sync set for the data item.

42. The computer-readable storage medium of claim 26 wherein the step of determining which copies are to be in the sync set includes establishing the sync set to be a copy against which the operation was requested, and the N closest other copies of the data item that are available.

43. The computer-readable storage medium of claim 26 wherein:
a static mapping is established between each copy and a sequence of other copies; and
the step of determining which copies are to be in the sync set includes establishing the sync set to be a copy against which the operation was requested, and the first N available copies in the sequence associated with the copy against which the operation was requested.

44. The computer-readable storage medium of claim 26 wherein the instructions include instructions for updating the copies in the async set in parallel.

45. The computer-readable storage medium of claim 26 wherein the instructions include instructions for updating the copies in the async set in serial.

46. The computer-readable storage medium of claim 26 wherein the copies in the async set are updated according to an order that is established based, at least in part, on at least one of:
the location of nodes that store the copies;
a performance characteristic of the nodes that store the copies; and
a performance characteristic of the network connections of the nodes that store the copies.

47. The computer-readable storage medium of claim 26 wherein a later-executed update is applied to a copy that belongs to the async set before an earlier-executed update is applied to said copy.

48. The computer-readable storage medium of claim 26, further storing one or more sequences of instructions which, when executed by the one or more processors, causes the one or more processors to perform:
determining, at the time the operation is to be performed, which copies of the data item are available for the operation to be performed on them;
wherein the two or more copies of the data item that are to be in the sync set are selected based, at least in part, on which copies of the data item are determined to be available for the operation to be performed on them at the time the operation is to be performed.

49. The computer-readable storage medium of claim 26, wherein the request is a request to perform an operation based on a particular copy of the data item, wherein the two or more copies include the particular copy.

50. The computer-readable storage medium of claim 26, wherein:
each copy of the data item is managed by a different node of a plurality of nodes;
the instructions, when executed by the one or more processors, further cause a first node of the plurality of nodes receiving the request to perform the operation that affects the data item;
the sync set includes at least a first copy of the data item, wherein the first copy is managed by the first node; and
the one or more processors belong to the first node.

\* \* \* \* \*